US008217884B2

(12) United States Patent
Mizuno

(10) Patent No.: US 8,217,884 B2
(45) Date of Patent: Jul. 10, 2012

(54) DIGITAL IMAGE DISPLAY

(75) Inventor: Daisuke Mizuno, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1160 days.

(21) Appl. No.: 12/044,547

(22) Filed: Mar. 7, 2008

(65) Prior Publication Data

US 2008/0218507 A1 Sep. 11, 2008

(30) Foreign Application Priority Data

Mar. 8, 2007 (JP) .................................. 2007-59126

(51) Int. Cl.
*G09G 3/36* (2006.01)
*G09G 5/00* (2006.01)
*G06F 3/038* (2006.01)

(52) U.S. Cl. ......................................... 345/99; 345/213

(58) Field of Classification Search .................. 345/204, 345/212, 213, 99, 100, 690, 694, 698; 348/536, 348/537
See application file for complete search history.

(56) References Cited

U.S. PATENT DOCUMENTS 6,700,570 B2 3/2004 Tachibana et al.

FOREIGN PATENT DOCUMENTS

| | | | |
|---|---|---|---|
| JP | 10-63234 | A | 3/1998 |
| JP | 2000-47648 | A | 2/2000 |
| JP | 2000-47649 | A | 2/2000 |
| JP | 2001-356729 | A | 12/2001 |

OTHER PUBLICATIONS

Japanese Office Action dated Feb. 24, 2009 w/English translation (three (3) pages).

*Primary Examiner* — Srilakshmi K Kumar
(74) *Attorney, Agent, or Firm* — Crowell & Moring LLP

(57) ABSTRACT

A digital image display capable of controlling an image signal output to a display screen portion, particularly capable of precisely controlling the phase of the image signal, regardless of provision/nonprovision of a function of communicating with an image signal output device is obtained. This digital image display includes an analog-to-digital conversion portion converting a received analog image signal to a digital image signal, a display screen portion displaying the digital image signal converted by the analog-to-digital conversion portion and a control portion controlling a clock value, a phase value, a horizontal position and vertical position of the digital image signal, while the control portion is so formed as to decide the optimum phase value on the basis of pixel data on the boundary between an image region having no image and another image region having an image in the digital image signal when controlling the phase value of the digital image signal.

14 Claims, 11 Drawing Sheets

FIG.3

IMAGE SIGNAL PARAMETER WITH RESPECT TO FORMAT

| FORMAT | | IMAGE SIGNAL PARAMETER | | | | | | | |
|---|---|---|---|---|---|---|---|---|---|
| RESOLUTION (HORIZONTAL x VERTICAL) | VERTICAL SYNCHRONIZING FREQUENCY (REFRESH RATE) | DOT CLOCK | HORIZONTAL SYNCHRO-NIZING FREQUENCY | VERTICAL SYNCHRO-NIZING FREQUENCY | HORIZONTAL DIRECTION TOTAL NUMBER OF PIXELS | HORIZONTAL DIRECTION NUMBER OF EFFECTIVE PIXELS | VERTICAL DIRECTION TOTAL NUMBER OF PIXELS | VERTICAL DIRECTION NUMBER OF EFFECTIVE PIXELS | SYNCHRONOUS POLARITY (H/V) |
| [pixel]x[pixel] | [Hz] | [MHz] | [kHz] | [Hz] | [pixel] | [pixel] | [pixel] | [pixel] | [-] |
| 640x480 | 60 | 25.175 | 31.469 | 59.940 | 800 | 640 | 525 | 480 | N/N |
| 640x480 | 75 | 31.500 | 37.500 | 75.000 | 840 | 640 | 500 | 480 | N/N |
| 720x400 | 70 | 28.322 | 31.469 | 70.087 | 900 | 720 | 449 | 400 | N/P |
| 800x600 | 60 | 40.000 | 37.879 | 60.317 | 1056 | 800 | 628 | 600 | P/P |
| 800x600 | 75 | 49.500 | 46.875 | 75.000 | 1056 | 800 | 625 | 600 | P/P |
| 832x624 | 74 | 57.283 | 49.725 | 74.550 | 1152 | 832 | 667 | 624 | N/N |
| 848x480 | 60 | 31.540 | 29.820 | 60.020 | 1058 | 848 | 496 | 480 | P/P |
| 1024x768 | 60 | 65.000 | 48.363 | 60.004 | 1344 | 1024 | 806 | 768 | N/N |
| 1024x768 | 70 | 75.000 | 56.476 | 70.069 | 1328 | 1024 | 806 | 768 | N/N |
| 1024x768 | 75 | 78.750 | 60.023 | 75.029 | 1312 | 1024 | 800 | 768 | P/P |
| 1280x768 | 60 | 68.250 | 47.396 | 59.995 | 1440 | 1280 | 790 | 768 | P/N |
| 1280x768 | 60 | 79.500 | 47.776 | 59.870 | 1664 | 1280 | 798 | 768 | N/P |
| 1360x768 | 60 | 85.500 | 47.712 | 60.015 | 1792 | 1360 | 795 | 768 | P/P |

DIGITAL IMAGE DISPLAY

BACKGROUND OF THE INVENTION

1. Field of the Invention

The present invention relates to a digital image display, and more particularly, it relates to a digital image display comprising a display screen portion displaying a digital image signal.

2. Description of the Background Art

A digital image display comprising a display screen portion displaying a digital image signal is known in general, as disclosed in each of Japanese Patent Laying-Open Nos. 10-63234 (1998), 2000-47649 and 2000-47648, for example.

Each of the aforementioned Japanese Patent Laying-Open Nos. 10-63234 and 2000-47649 discloses a digital image display comprising an analog-to-digital conversion circuit, an image start/end coordinates detection circuit, a display control circuit and an image display portion (display screen portion). The digital image display described in each of Japanese Patent Laying-Open Nos. 10-63234 and 2000-47649 is so formed as to decide the optimum phase value when controlling the phase of a digital image signal output to the image display portion by obtaining the arithmetic mean (intermediate value) of a reference phase value and a phase value obtained by changing the reference phase value for horizontally shifting the left end position (coordinates) of a pixel region having image data by a prescribed distance (number of pixels).

The aforementioned Japanese Patent Laying-Open No. 2000-47648 proposing a digital image display discloses an automatic display position control system of controlling a display position of an image signal (image) on a screen display connected to a body screen output device by transmitting/receiving respective status data between the screen display and the body screen output device outputting the image signal to the screen display. According to the automatic display position control system disclosed in Japanese Patent Laying-Open No. 2000-47648, the display position of the image signal (image) on the screen display connected to the body screen output device can be controlled by changing setting in the body screen output device on the basis of the status data of the screen display.

In the conventional digital image display proposed in each of the aforementioned Japanese Patent Laying-Open Nos. 10-63234 and 2000-47649, however, the intermediate value according to the arithmetic mean of the reference phase value and the phase value obtained by changing the reference phase value for horizontally shifting the left end position (coordinates) of the pixel region by the prescribed distance (number of pixels) is regarded as the optimum phase value. Therefore, a position (edge portion) maximumly displaying the difference between the colors of adjacent pixels by phase control is conceivably not strictly specified. Thus, the optimum phase value is not exactly obtained.

In the conventional automatic display position control system proposed in the aforementioned Japanese Patent Laying-Open No. 2000-47648, the body screen output device connected with the screen display controls the image signal (display image) on the basis of the communicative function between the screen display and the body screen output device. If a screen display incapable of communicating with the body screen output device (image signal output device) is connected to the body screen output device, therefore, the image signal (display image) output to a display screen portion of the screen display cannot be controlled.

SUMMARY OF THE INVENTION

The present invention has been proposed in order to solve the aforementioned problems, and an object of the present invention is to provide a digital image display capable of controlling an image signal output to a display screen portion, particularly capable of precisely controlling the phase of the image signal, regardless of provision/nonprovision of a function of communicating with an image signal output device.

A digital image display according to an aspect of the present invention comprises an analog-to-digital conversion portion converting a received analog image signal to a digital image signal, a display screen portion displaying the digital image signal converted by the analog-to-digital conversion portion and a control portion controlling a clock value, a phase value, a horizontal position and a vertical position of the digital image signal converted by the analog-to-digital conversion portion, while the control portion is so formed as to decide the optimum phase value on the basis of pixel data on the boundary between an image region having no image and another image region having an image in the digital image signal when controlling the phase value of the digital image signal.

As hereinabove described, the digital image display according to the aspect of the present invention comprises the control portion controlling the clock value, the phase value, the horizontal position and the vertical position of the digital image signal converted by the analog-to-digital conversion portion so that the control portion can control the clock value, the phase value, the horizontal position and the vertical position of the digital image signal converted by the analog-to-digital conversion portion of the display body on the basis of an image signal received from an analog image signal output device (image signal output device) externally connected to the display body. Even when the digital image display is connected with an analog image signal output device (image signal output device) having no communicative function, therefore, the control portion can control the image signal output to the display screen portion. Further, the control portion is so formed as to decide the optimum phase value on the basis of the pixel data on the boundary between the image region having no image and the other image region having an image in the digital image signal when controlling the phase value of the digital image signal thereby exactly obtaining the optimum phase value, whereby the image signal can be precisely phase-controlled.

In the digital image display according to the aforementioned aspect, the control portion is preferably so formed as to determine the boundary between the image region having no image and the image region having an image on the basis of adjacent pixel data included in the pixel data. According to this structure, the control portion can reliably identify the boundary (edge portion) between the image region having no image and the image region having an image.

In the digital image display according to the aforementioned aspect, the pixel data preferably consists of respective color gradations corresponding to the three primary colors of light, and the control portion is preferably so formed as to decide the optimum phase value on the basis of a result of comparison between the respective color gradations, corresponding to the three primary colors of light, of a first pixel on either the left end or the right end, closer to the image region having an image, of the boundary between the image region having no image and the image region having an image in the digital image signal and the respective color gradations, corresponding to the three primary colors of light, of a second pixel either leftwardly or rightwardly adjacent to the first pixel when deciding the optimum phase value. According to this structure, the respective color gradations, corresponding to the three primary colors of light, of each pixel data are used for searching for the phase value for most conspicuously displaying the boundary (edge portion) between the image region having no image and the image region having an image from the digital image signal on the display screen portion through phase control, whereby the control portion can easily perform the phase control.

In the aforementioned structure having the control portion deciding the optimum phase value on the basis of the respective color gradations, corresponding to the three primary colors of light, of the first pixel, the control portion is preferably so formed as to determine the phase value maximizing the difference between the sum of squares of at least one prescribed color gradation included in the respective color gradations, corresponding to the three primary colors of light, of the first pixel and the sum of squares of at least one prescribed color gradation included in the respective color gradations, corresponding to the three primary colors of light, of the second pixel either leftwardly or rightwardly adjacent to the first pixel as the optimum phase value when deciding the optimum phase value. According to this structure, the control portion decides the optimum phase value only through the information of the prescribed color gradation included in the respective color gradations, corresponding to the three primary colors of light, of the pixel data, whereby the processing of the control portion can be quickened.

In this case, the control portion is preferably so formed as to determine the phase value maximizing the difference between the sum of squares of the respective color gradations, corresponding to the three primary colors of light, of the first pixel and the sum of squares of the respective color gradations, corresponding to the three primary colors of light, of the second pixel either leftwardly or rightwardly adjacent to the first pixel as the optimum phase value when deciding the optimum phase value. According to this structure, the control portion searches for the phase value for most conspicuously displaying the boundary (edge portion) between the image region having no image and the image region having an image in consideration of influences exerted by all components of the respective color gradations, corresponding to the three primary colors of light, of the pixel data, thereby more reliably deciding the optimum phase value.

In the aforementioned structure having the control portion deciding the optimum phase value on the basis of at least one prescribed color gradation included in the respective color gradations of the first pixel, the control portion is preferably so formed as to obtain the maximum value of the difference between the sum of squares of the prescribed one color gradation included in the respective color gradations, corresponding to the three primary colors of light, of the first pixel and the sum of squares of the prescribed one color gradation included in the respective color gradations, corresponding to the three primary colors of light, of the second pixel either leftwardly or rightwardly adjacent to the first pixel by putting the phase forward with a pitch width of an equiangularly divided prescribed phase angle when deciding the optimum phase value. According to this structure, the control portion can decide the optimum phase value while sequentially assigning a plurality of phase values corresponding to the divided prescribed phase angle, thereby more precisely deciding the optimum phase value.

In this case, the control portion is preferably so formed as to store the difference between the sum of squares of the prescribed one color gradation of the first pixel and the sum of squares of the prescribed one color gradation of the second pixel at a second phase value put forward from a first phase value by the prescribed phase angle as the maximum value when the difference between the sum of squares of the prescribed one color gradation of the first pixel and the sum of squares of the prescribed one color gradation of the second pixel at the second phase value is greater than the difference between the sum of squares of the prescribed one color gradation of the first pixel and the sum of squares of the prescribed one color gradation of the second pixel at the first phase value. According to this structure, the control portion regularly continuously holds the maximum value, whereby the processing of the control portion can be further quickened dissimilarly to a method of extracting the maximum value after storing all differentials between the sums of squares at the respective phase values.

In the aforementioned structure having the control portion deciding the optimum phase value on the basis of the result of comparison between the respective color gradations corresponding to the three primary colors of light, the analog image signal is preferably constituted of the image regions and a non-image region so provided as to enclose the image regions, and the control portion is preferably so formed as to detect the first pixel on either the left end or the right end closer to the image region having an image included in the image regions by scanning a prescribed range in the vicinity of the boundary between the non-image region and the image regions in the analog image signal. According to this structure, the control portion scanning the boundary where the non-image region is switched to the image regions, providing the highest probability of detecting the first pixel on the left end or the right end of the image region having an image, can easily detect the first pixel.

In the aforementioned structure having the control portion detecting the first pixel by scanning the prescribed range of the analog image signal, the control portion is preferably so formed as to detect the first pixel on either the left end or the right end closer to the image region having an image included in the image regions by scanning the prescribed range corresponding to a prescribed number of pixels from a prescribed position of the non-image region. According to this structure, the scanning range can be easily set on the basis of the number of pixels.

In the aforementioned structure having the control portion detecting the first pixel by scanning the prescribed range of the analog image signal, the control portion is preferably so formed as to detect the first pixel on either the left end or the right end closer to the image region having an image included in the image regions on the basis of the brightness of a pixel detected by the control portion when scanning the prescribed range in the vicinity of the boundary between the non-image region and the image regions. According to this structure, the control portion can easily detect the first pixel switched from the image region (dark region) having no image included in the image regions to the image region (bright region) having an image.

In the aforementioned structure having the control portion detecting the first pixel on the basis of the brightness of the pixel, the control portion is preferably so formed as to decide the pixel as the first pixel on either the left end or the right end closer to the image region having an image when the brightness of the pixel detected by the control portion is in excess of a prescribed value. According to this structure, the control portion can more reliably detect the first pixel switched from the image region (dark region) having no image included in the image regions to the image region (bright region) having an image.

In the aforementioned structure having the control portion detecting the first pixel by scanning the prescribed range of the analog image signal, the control portion is preferably so formed as to decide a pixel on either the left end or the right end of the prescribed range as the first pixel when not detecting the first pixel by scanning the prescribed range. According to this structure, the control portion decides the pixel on the end of the scanned prescribed range as the first pixel, thereby preventing the display screen portion from displaying the automatically controlled image region in a state omitting the left end or the right end thereof.

In the digital image display according to the aforementioned aspect, the control portion is preferably so formed as to control the phase value on the basis of a result of control of the clock value of the digital image signal. According to this structure, the control portion can control the phase value on the basis of the digital image signal displayed with the controlled clock value, thereby more precisely controlling the picture quality.

The digital image display according to the aforementioned aspect preferably further comprises a storage portion previously storing resolutions and vertical synchronizing frequencies displayable on the display screen portion by the control portion, and the control portion is preferably so formed as to store the initial values of the clock value, the phase value, the horizontal position and the vertical position for deciding the optimum phase value on the basis of results of detection of the resolution and the vertical synchronizing frequency of the digital image signal converted by the analog-to-digital conversion portion. According to this structure, the control portion can start controlling the phase value and the clock value with reference to the initial values stored in the memory portion, whereby the time required for controlling the picture quality can be reduced dissimilarly to a case provided with no initial values of the phase value and the clock value.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a table showing the contents of image signal parameters previously stored in the liquid crystal display according to the embodiment shown in FIG. 1;

DESCRIPTION OF THE PREFERRED EMBODIMENTS

An embodiment of the present invention is now described with reference to the drawings.

First, the structure of a liquid crystal display 10 according to the embodiment of the present invention is described with reference to FIGS. 1 to 5. According to this embodiment, the present invention is applied to the liquid crystal display 10 employed as an exemplary digital image display.

Figure 1:
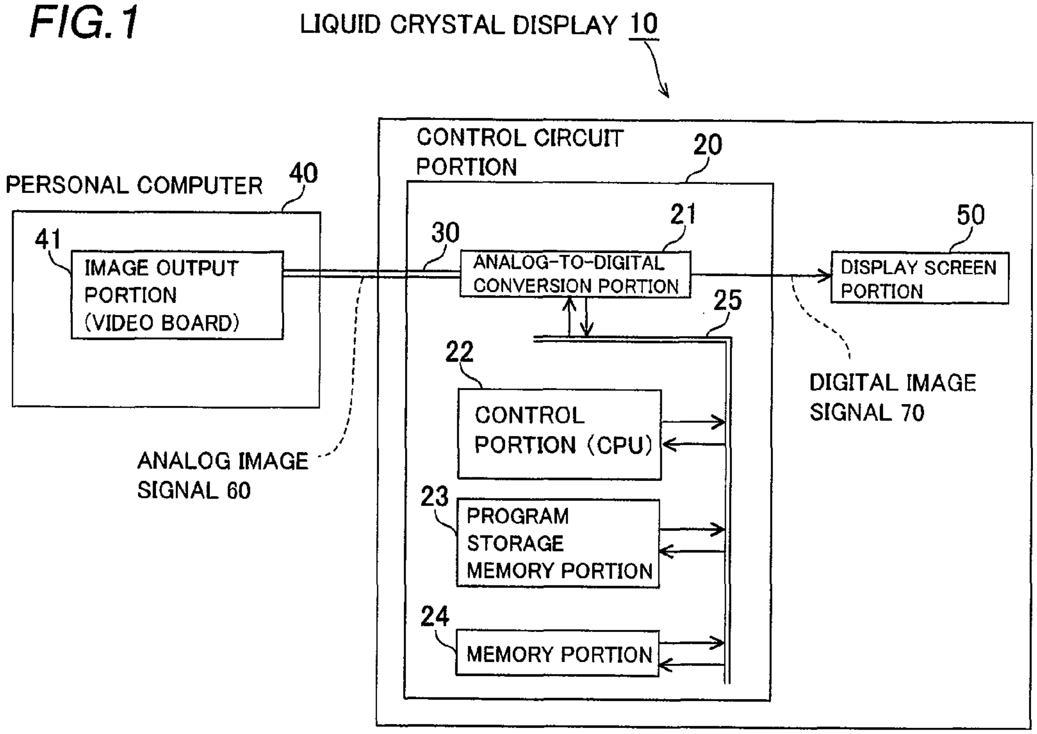
FIG. 1 is a block diagram showing the circuit structure of a liquid crystal display according to an embodiment of the present invention.

In the liquid crystal display 10 according to the embodiment of the present invention, a control circuit portion 20 provided on the display body is connected to a personal computer 40 through a cable 30 and connected with a display screen portion 50 in the display body, so that the display screen portion 50 can display an analog image signal 60 output from an image output portion (video board) 41 of the personal computer 40, as shown in FIG. 1.

Figure 2:
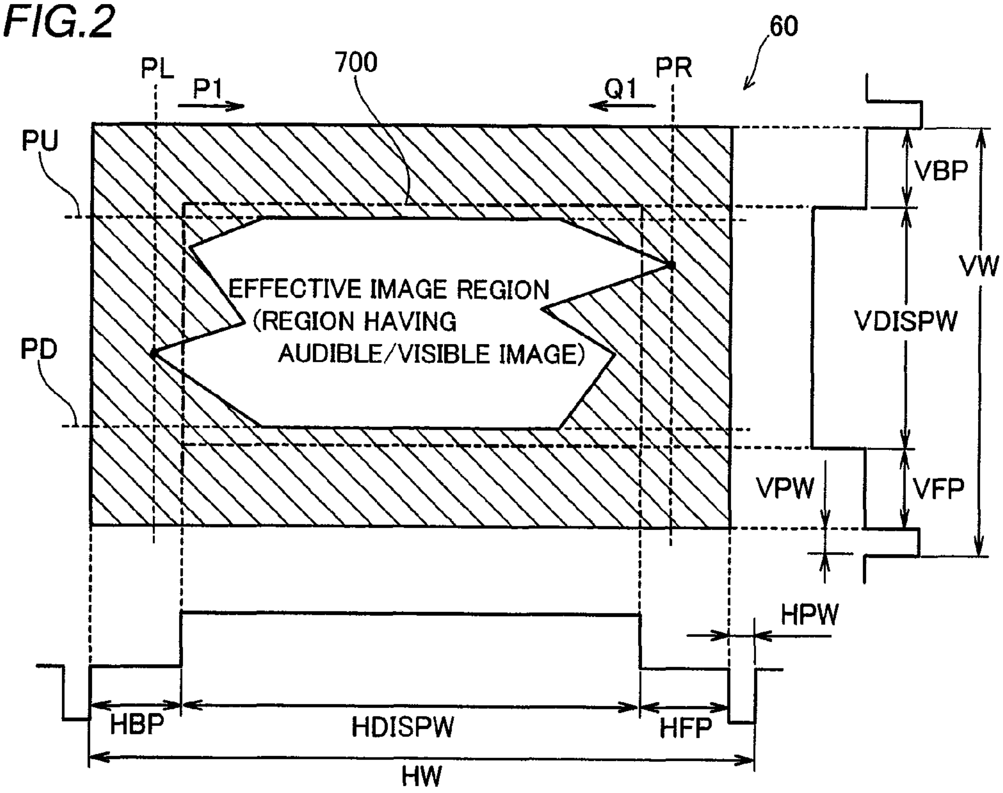
FIG. 2 illustrates the structure of an analog image signal input in the liquid crystal display according to the embodiment shown in FIG. 1.

The analog image signal 60 output from the image output portion (video board) 41 of the personal computer 40 is so formed that data of one image frame (one still image) can be reproduced as an audible/visible image by continuously transmitting one frame with a horizontal synchronizing frequency as data (analog voltage value) divided every horizontal scanning line of the image and continuously updating/displaying (refreshing) one image frame with a vertical synchronizing frequency. Data (horizontal synchronizing interval HW) of one horizontal scanning line of the image is formed by successively linking data elements of a horizontal back-porch width HBP, a horizontal effective image region HDISPW, a horizontal front-porch width HFP and a horizontal synchronizing frequency width HPW with each other, as shown in FIG. 2. Data (vertical synchronizing interval VW) of one vertical frame of the image is also formed by repetitively linking timing data of a vertical back-porch width VBP, a vertical effective image region VDISPW, a vertical front-porch width VFP and a vertical synchronizing frequency width VPW with each other, thereby defining a vertical image display position. The horizontal back-porch width HBP and the horizontal effective image region HDISPW are examples of the "non-image region" and the "image region" in the present invention respectively.

In the aforementioned analog image signal 60, respective parameters such as the horizontal back-porch width HBP, the horizontal effective image region HDISPW, the horizontal front-porch width HFP, the horizontal synchronizing frequency width HPW, the vertical back-porch width VBP, the vertical effective image region VDISPW and the vertical front-porch width VFP are generally defined according to VESA (Video Electronics Standards Association) in correspondence to combinations of resolutions of images and vertical synchronizing frequencies (refresh rates), as shown in FIG. 3.

According to this embodiment, the control circuit portion 20 of the liquid crystal display 10 includes an analog-to-digital conversion portion 21 for converting the analog image signal 60 received from the personal computer 40 to a digital image signal 70 by reading the same at prescribed timing, as shown in FIG. 1. The control circuit portion 20 further includes a control portion 22 formed by a CPU controlling the analog-to-digital conversion portion 21, as shown in FIG. 1. The control portion 22 is enabled to automatically control the picture quality of the digital image signal 70 displayed on the display screen portion 50. At this time, the control portion 22 can control various parameters such as a clock value CLK (pixel clock), a phase value PH, a horizontal imaging position and a vertical imaging position with respect to the analog-to-digital conversion portion 21 according to a prescribed algorithm described later.

The control portion 22 controls the clock value CLK (pixel clock) oscillated by the analog-to-digital conversion portion 21 (see FIG. 1), in order to synchronize the same with a dot clock value of the analog image signal 60 when the analog-to-digital conversion portion 21 (see FIG. 1) converts the analog image signal 60 to the digital image signal 70. The control portion 22 so properly controls the clock value CLK oscillated by the analog-to-digital conversion portion 21 (see FIG. 1) that the display screen portion 50 can display a picture (image) having neither improper horizontal expansion/contraction nor vertical stripes. As to the phase value PH, the control portion 22 controls the phase of the clock value CLK oscillated by the analog-to-digital conversion portion 21 (see FIG. 1). In other words, the control portion 22 controls the timing of the analog-to-digital conversion portion 21 (see FIG. 1) for sampling the analog image signal 60 with the clock value CLK synchronous with the dot clock value of the analog image signal 60 output from the personal computer 40. The control portion 22 so properly controls the phase value PH that the display screen portion 50 can display a picture (image) prevented from blurring or bleeding of characters and pictures.

The control portion 22 controls the horizontal and vertical imaging positions in order to display a region enclosed with a portion between left and right end positions PL and PR (see FIG. 2) of a region of the horizontal synchronizing interval HW (see FIG. 2) of the analog image signal 60 (see FIG. 1) provided with the image and a portion between upper and lower end positions PU and PD (see FIG. 2) of a region of the vertical synchronizing interval VW (see FIG. 2) provided with the image in a state set in the frame of the display screen portion 50 after the analog image signal 60 is converted to the digital image signal 70 by the analog-to-digital conversion portion 21.

Figure 4:
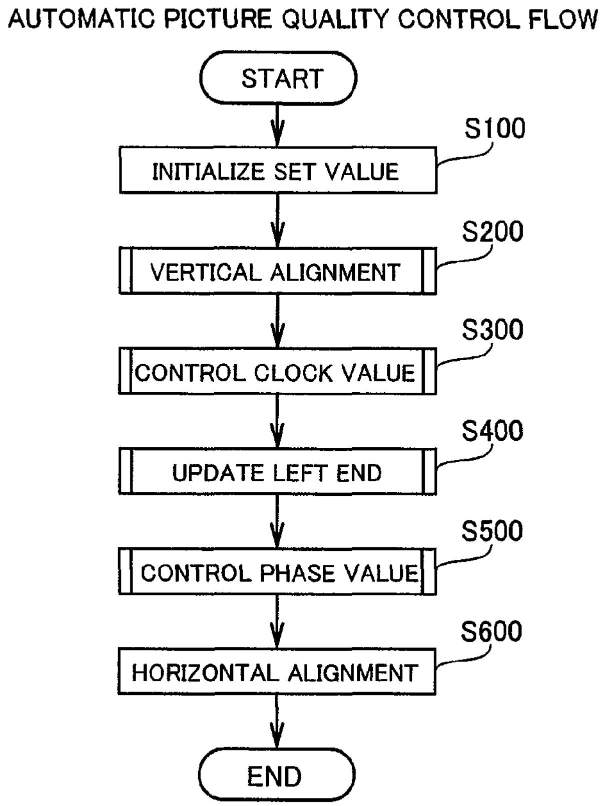
FIG. 4 illustrates the structure of an automatic control flow for controlling the picture quality of an image displayed on the liquid crystal display according to the embodiment shown in FIG. 1.

The control portion 22 is enabled to execute an automatic control flow for automatically controlling the picture quality of the digital image signal 70 displayed on the display screen portion 50, as shown in FIG. 4. In the automatic control flow, the control portion 22 sequentially executes an initialization step S100 of setting picture quality control parameters (the clock value CLK and the phase value PH) corresponding to the combination of the resolution of the image and the vertical synchronizing frequency (refresh rate) to initial values, a vertical imaging position control step S200, clock value control steps S300 and S400, a phase value control step S500 and a horizontal imaging position control step S600, as shown in FIG. 4.

Figure 5:
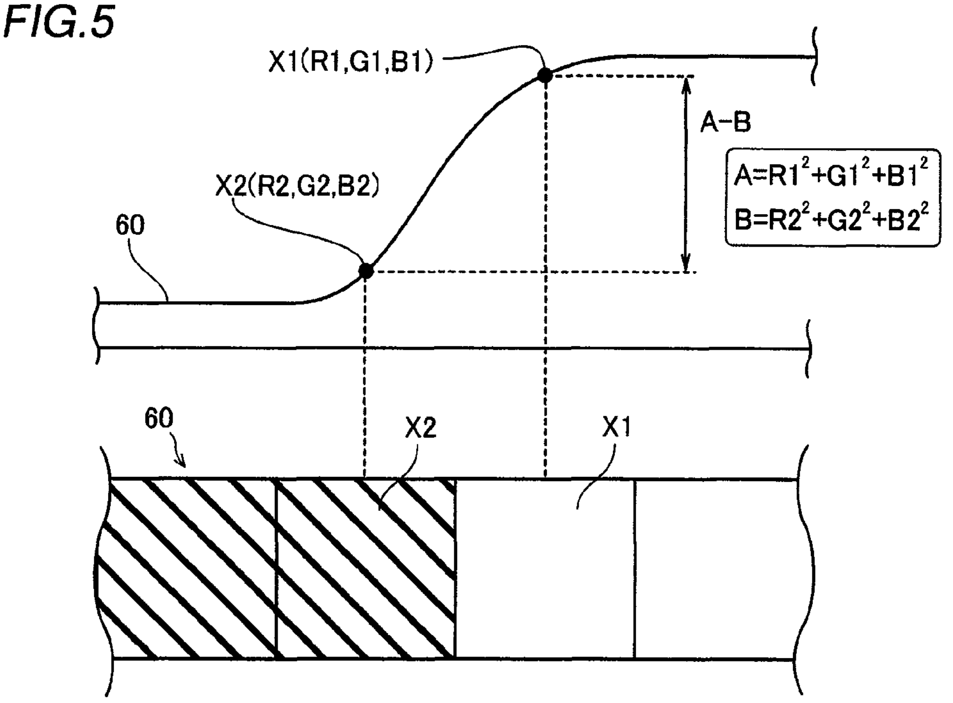
FIG. 5 is a conceptual diagram related to phase value control in the automatic control flow shown in FIG. 4.

According to this embodiment, the control portion 22 (see FIG. 1) is enabled to control the phase value PH by comparing the magnitudes (degrees) of the gradations of colors R (red), G (green) and B (blue) of adjacent pixels X1 and X2 present on the boundary where the analog image signal 60 is converted from a signal (voltage value) indicating that the same has no image to a signal (voltage value) indicating that the same has an image at the phase value control step S500 (see FIG. 4), as shown in FIG. 5. In this case, the control portion 22 executes an algorithm of sequentially changing the phase value PH thereby changing the differential C between the sum A of the squares of the respective color gradations R, G and B of the pixel X1 and the sum B of the squares of the respective color gradations R, G and B of the pixel X2 and determining that the phase value PH maximizing the differential C is the optimum sampling timing in particular. Thus, the control portion 22 can decide the timing (phase value PH) of the analog-to-digital conversion portion 21 (see FIG. 1) for sampling the analog image signal 60 in order to enable the display screen portion 50 to display the pixels X1 and X2 in most conspicuous states. The pixels X1 and X2 are examples of the "first pixel" and the "second pixel" in the present invention respectively.

As shown in FIG. 1, the control circuit portion 20 further includes a program storage memory portion 23 storing a control program for allowing the control portion 22 to perform the aforementioned automatic picture quality control and a memory portion 24 storing results of various calculations executed in automatic control and the parameters such as the clock value CLK and the phase value H decided in automatic control, in addition to the aforementioned components. A bus (transmission line) 25 connects the components of the control circuit portion 20 with each other as shown in FIG. 1, so that the components can transmit and receive control signals and control data to and from each other.

An operation of the control portion 22 of the liquid crystal display 10 according to this embodiment for automatically controlling the picture quality is now described with reference to FIGS. 1 to 13.

When the image output portion (video board) 41 of the personal computer 40 outputs an analog image signal 60 having a prescribed resolution and a vertical synchronizing frequency (refresh rate) to the liquid crystal display 10 connected to the personal computer 40 as shown in FIG. 1, the control portion 22 executes the automatic control flow shown in FIG. 4.

First, the control portion 22 detects the analog image signal 60 received from the personal computer 40 through the analog-to-digital conversion portion 21 (see FIG. 1) and collates the parameters thereof with the various parameters (contents shown in FIG. 3) previously stored in the memory portion 24 (see FIG. 1) thereby specifying the resolution and the vertical synchronizing frequency (refresh rate) of the analog image signal 60, as shown in FIG. 4. At the step S100 (see FIG. 4), the control portion 22 stores the picture quality control parameters (the clock value CLK and the phase value PH) in the memory portion 24 (see FIG. 1) as initial values on the basis of the specified resolution and the specified vertical synchronizing frequency (refresh rate).

At the step S200 (see FIG. 4), the control portion 22 aligns the upper end position PU (see FIG. 2) of the region of the vertical effective image region VDISPW (see FIG. 2) provided with the image and the upper end of the display screen portion 50 (see FIG. 1) with each other on the basis of the data of one image frame (one still image) read by the analog-to-digital conversion portion 21. More specifically, the control portion 22 executes a subroutine shown in FIG. 6.

Figure 6:
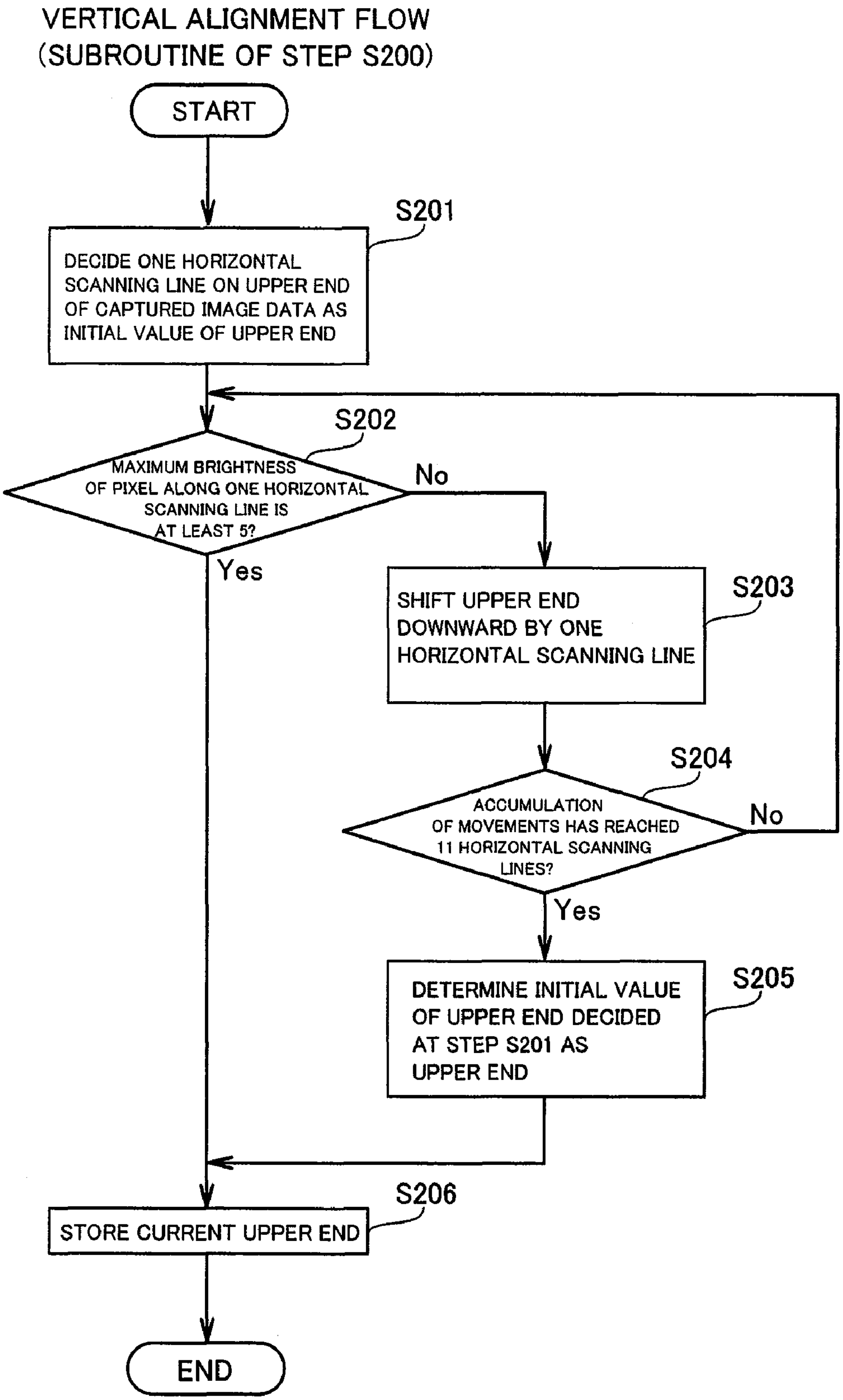
FIGS. 6 to 12 are flow charts of the automatic control flow for controlling the picture quality of the image displayed on the liquid crystal display according to the embodiment shown in FIG. 1.

At a step S201, the control portion 22 temporarily decides a position (vertical row number) of one horizontal scanning line starting the vertical effective image region VDISPW (see FIG. 2) included in the data of one image frame of the analog image signal 60 (see FIG. 2) as the upper end position PU and stores the same in the memory portion 24 (see FIG. 1), as shown in FIG. 6. Then, the control portion 22 determines whether or not the maximum brightness on the temporarily decided upper end position PU in the horizontal effective image region HDISPW (see FIG. 2) of one horizontal scanning line is at least 5 at a step S202. If determining that the maximum brightness on the temporarily decided upper end position PU in the horizontal effective image region HDISPW (see FIG. 2) of one horizontal scanning line is not at least 5, the control portion 22 shifts the upper end position PU (vertical row number) temporarily decided at the step S201 downward by one row (one horizontal scanning line) and temporarily decides this position as a new upper end position PU at a step S203. At a step S204, the control portion 22 determines whether or not the accumulation of the decrements (movements) of the upper position PU has reached 11 rows (corresponding to 11 horizontal scanning lines). If determining that the accumulation of the decrements of the upper end position PU has not reached 11 rows, the control portion 22 returns to the step S202 and determines whether or not the current maximum brightness in the horizontal effective image region HDISPW (see FIG. 2) of one horizontal scanning line is at least 5.

If determining that the accumulation of the decrements of the upper position PU has reached 11 rows at the step S204, on the other hand, the control portion 22 determines the initial value of the upper end position PU temporarily decided at the step S201 as the upper end position of one image frame at a step S205. If determining that the maximum brightness on the temporarily decided upper end position PU in the horizontal effective image region HDISPW (see FIG. 2) of one horizontal scanning line is at least 5 at the step S202, further, the control portion 22 determines that the position (vertical row number) of this horizontal scanning line is the upper end position of one image frame. Thus, the control portion 22 decides the upper end position PU temporarily decided at present as the vertical upper end position to be displayed on the display screen portion 50 and stores this upper end position PU (vertical row number) in the memory portion 24 (see FIG. 1) at a step S206.

In the stage of deciding the upper end position PU at the aforementioned step S200 (see FIG. 4), the control portion 22 automatically decides the lower end position PD (vertical row number) on the basis of the number of horizontal scanning lines (vertical resolution) of the resolution specified at the precedent step S100 (see FIG. 4).

At a step S300 (see FIG. 4), the control portion 22 controls the clock value CLK on the basis of the data of one image frame (one still image) read by the analog-to-digital conversion portion 21. More specifically, the control portion 22 sequentially executes subroutines shown in FIGS. 7 to 11 respectively.

Figure 7:
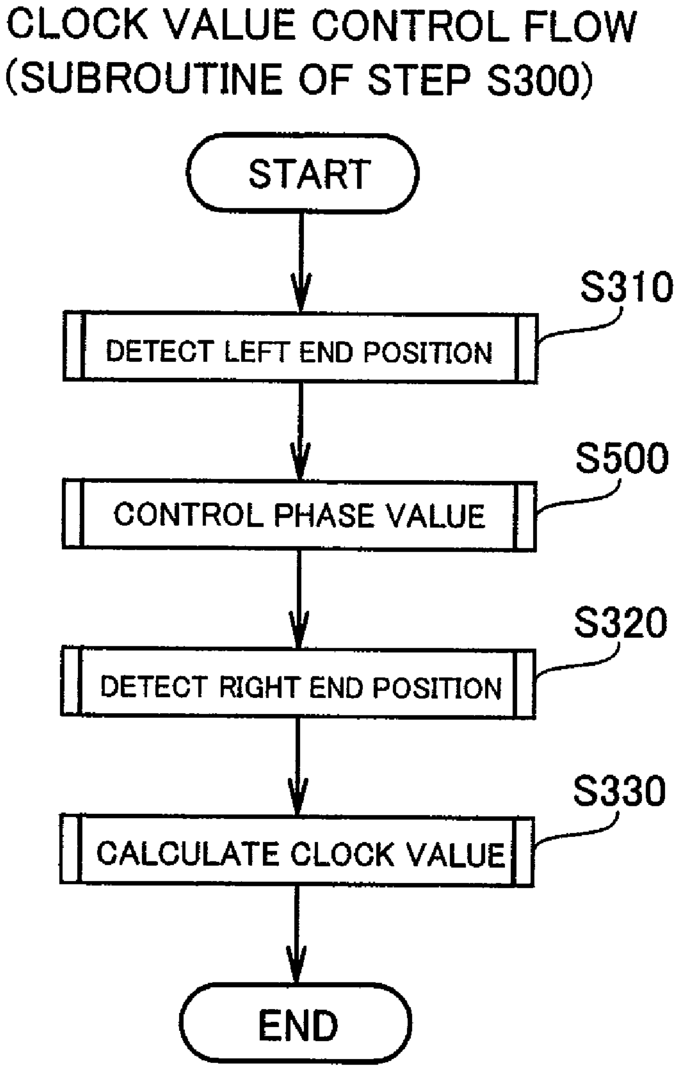
Figure 8:
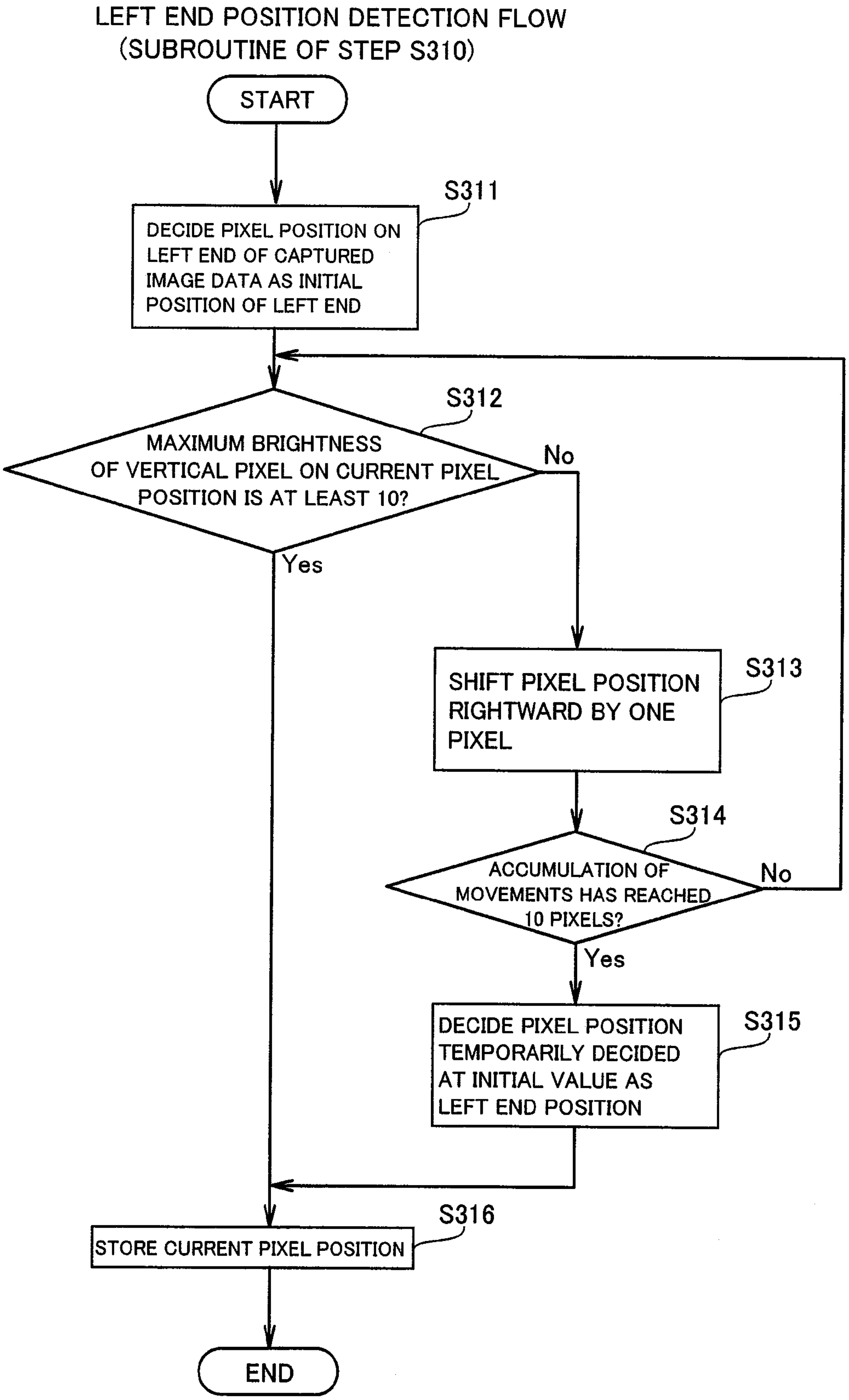

At a step S310, the control portion 22 detects the left-end pixel position of a region, having an image, included in the horizontal effective image region HDISPW (see FIG. 2) in the data of one image frame, as shown in FIGS. 7 and 8.

According to this embodiment, the control portion 22 temporarily decides the horizontal position of a pixel on a prescribed position in the horizontal back-porch width HBP (see FIG. 2) included in the data of one image frame of the analog image signal 60 (see FIG. 2) as the left end position PL (see FIG. 2) and stores the same in the memory portion 24 (see FIG. 1) at a step S311, as shown in FIG. 8. Then, the control portion 22 determines whether or not the maximum brightness of a vertical pixel train on the temporarily decided left end position PL is at least 10 at a step S312. If determining that the maximum brightness of the vertical pixel train on the temporarily decided left end position PL is not at least 10, the control portion 22 shifts the left end position PL (horizontal pixel position) temporarily decided at the step S311 rightward (along arrow P1 in FIG. 2) by one pixel and temporarily decides this position as a new left end position PL at a subsequent step S313. At a step S314, the control portion 22 determines whether or not the accumulation of the movements of the left end position PL has reached a prescribed number of pixels (10 pixels). If determining that the accumulation of the movements of the left end position PL has not reached the prescribed number of pixels (10 pixels), the control portion 22 returns to the step S312 and determines whether or not the maximum brightness of the vertical pixel train on the current left end position PL is at least 10. If determining that the accumulation of the movements of the left end position PL has reached the prescribed number of pixels (10 pixels) at the step S314, on the other hand, the control portion 22 determines the initial value of the left end position PL temporarily decided at the step S311 as the left end position of one image frame at a step S315.

If determining that the maximum brightness of the vertical pixel train on the temporarily decided left end position PL is at least 10 at the step S312, the control portion 22 determines that this left end position PL (horizontal pixel position) is the left end position of one image frame, as shown in FIG. 8. Thus, the control portion 22 decides the left end position PL temporarily decided at present as the horizontal left end position PL to be displayed on the display screen portion 50 and stores this left end position PL in the memory portion 24 (see FIG. 1) at a step S316.

Then, the control portion 22 controls the phase value PH on the basis of the left end position PL decided at the step S310, as shown in FIG. 7. More specifically, the control portion 22 executes a subroutine shown in FIG. 9.

Figure 9:
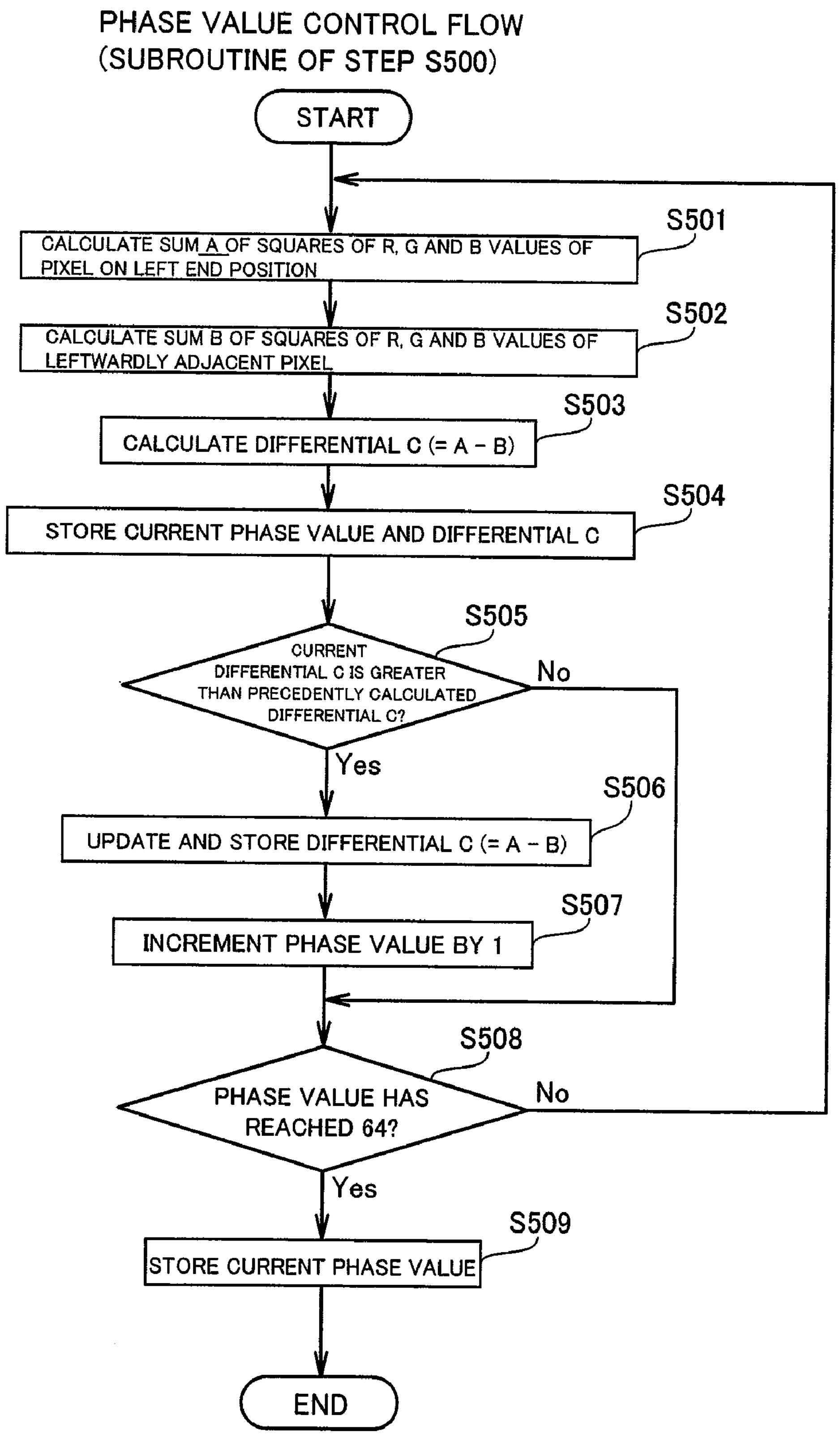

According to this embodiment, the control portion 22 calculates the sum A of the squares of respective color gradations (R1, G1 and B1) of the colors R (red), G (green) and B (blue) of the pixel X1 on the left end position PL (see FIG. 2) at a step S501, as shown in FIG. 9. In other words, the control portion 22 calculates the sum A as follows, as shown in FIG. 5:

$$A=R1^2+G1^2+B1^2$$

At a step S502, the control portion 22 calculates the sum B of the squares of respective color gradations (R2, G2 and B2) of the colors R (red), G (green) and B (blue) of the pixel X2 leftwardly adjacent to the pixel X1 (on the left end position) subjected to the calculation at the step S501. In other words, the control portion 22 calculates the sum B as follows, as shown in FIG. 5:

$$B=R2^2+G2^2+B2^2$$

Then, the control portion 22 calculates the differential C (C=A−B) between the calculated value (sum A of the squares of the color gradations R, G and B) obtained at the step S501 in relation to the pixel X1 and the calculated value (sum B of the squares of the color gradations R, G and B) obtained at the step S502 in relation to the pixel X2 at a step S503, and stores the current phase value PH and the calculated differential C in the memory portion 24 (see FIG. 1) as the initial values respectively at a step S504.

As shown in FIG. 9, the control portion 22 determines whether or not the currently calculated differential C is greater than a precedently calculated differential C at a step S505. If determining that the currently calculated differential C is greater than the precedently calculated differential C, the control portion 22 stores the current differential C in the memory portion 24 at a step S506, and increments the phase value PH by one (according to this embodiment, the control portion 22 puts the phase forward by an angle obtained by dividing a phase angle of 180° into 64 phase angles in order to increment the phase value PH by one) at a step S507. At a step S508, the control portion 22 determines whether or not the phase value PH has reached 64. If determining that the phase value PH has not reached 64, the control portion 22 returns to the step S501 and repeats the steps S501 to S504. If determining that the currently calculated differential C is less than the precedent differential C at the step S505, on the other hand, the control portion 22 advances to a step S508 while leaving the current phase value PH at the optimum value. If determining that the phase value PH has reached 64 at the step S508, further, the control portion 22 decides the phase value PH and stores the same in the memory portion 24 (see FIG. 1) at a step S509.

The control portion 22 can more precisely decide the left end position PL (see FIG. 2) by controlling the phase value PH immediately after deciding the left end position PL (see FIG. 2) at the precedent step S310 (see FIG. 7).

As shown in FIG. 7, the control portion 22 detects the right end pixel position of the region, having an image, included in the horizontal effective image region HDISPW (see FIG. 2) in the data of one image frame at a step S320.

Figure 10:
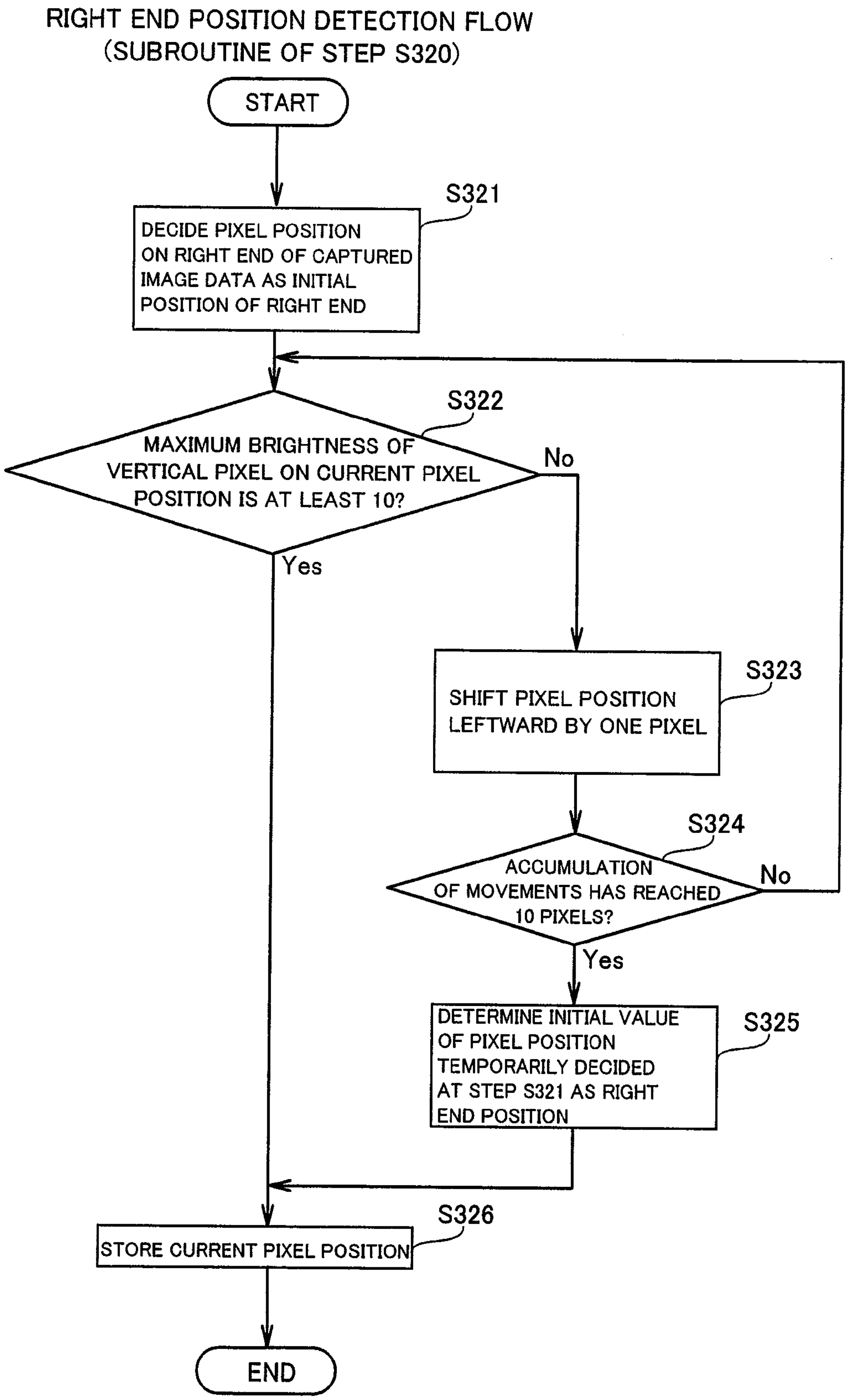

According to this embodiment, the control portion 22 temporarily decides the horizontal position of the pixel on the prescribed position in the horizontal back-porch width HBP (see FIG. 2) included in the data of one image frame as the right end position PR and stores the same in the memory portion 24 (see FIG. 1) at a step S321, as shown in FIG. 10. Then, the control portion 22 determines whether or not the maximum brightness of the vertical pixel train on the temporarily decided right end position PR (see FIG. 2) is at least 10 at a step S322. If determining that the maximum brightness of the vertical pixel train on the temporarily decided right end position PR is not at least 10, the control portion 22 shifts the right end position PR (horizontal pixel position) temporarily decided at the step S321 leftward (along arrow Q1 in FIG. 2) by one pixel and temporarily decides this position as a new right end position PR at a subsequent step S323. At a step S324, the control portion 22 determines whether or not the accumulation of the movements of the right end position PR has reached the prescribed number of pixels (10 pixels). If determining that the accumulation of the movements of the right end position PR has not reached the prescribed number of pixels (10 pixels), the control portion 22 returns to the step S322 and determines whether or not the maximum brightness of the vertical pixel train on the current right end position PR is at least 10. If determining that the accumulation of the movements of the right end position PR has reached the prescribed number of pixels (10 pixels) at the step S324, on the other hand, the control portion 22 determines the initial value of the right end position PR temporarily decided at the step S321 as the right end position of one image frame at a step S325.

If determining that the maximum brightness of the vertical pixel train on the temporarily decided right end position PR is at least 10 at the step S322, on the other hand, the control portion 22 decides that this right end position PR (horizontal pixel position) is the right end position of one image frame, as shown in FIG. 10. Thus, the control portion 22 decides the right end position PR temporarily decided at present as the horizontal right end position PR to be displayed on the display screen portion 50 and stores this right end position PR in the memory portion 24 (see FIG. 1) at a step S326.

The control portion 22 can also more precisely decide the right end position PR by controlling the phase value PH immediately after deciding the left end position PL at the precedent step S500 (see FIG. 9).

As shown in FIG. 7, the control portion 22 obtains the optimum clock value CLK oscillated by the analog-to-digital conversion portion 21 on the basis of the left and right end positions PL and PR of a pixel region, provided with an image, of an effective display region (enclosed with one-chain dot lines 700 in FIG. 2) obtained through the steps S310 and S320 at a step S330.

Figure 11:
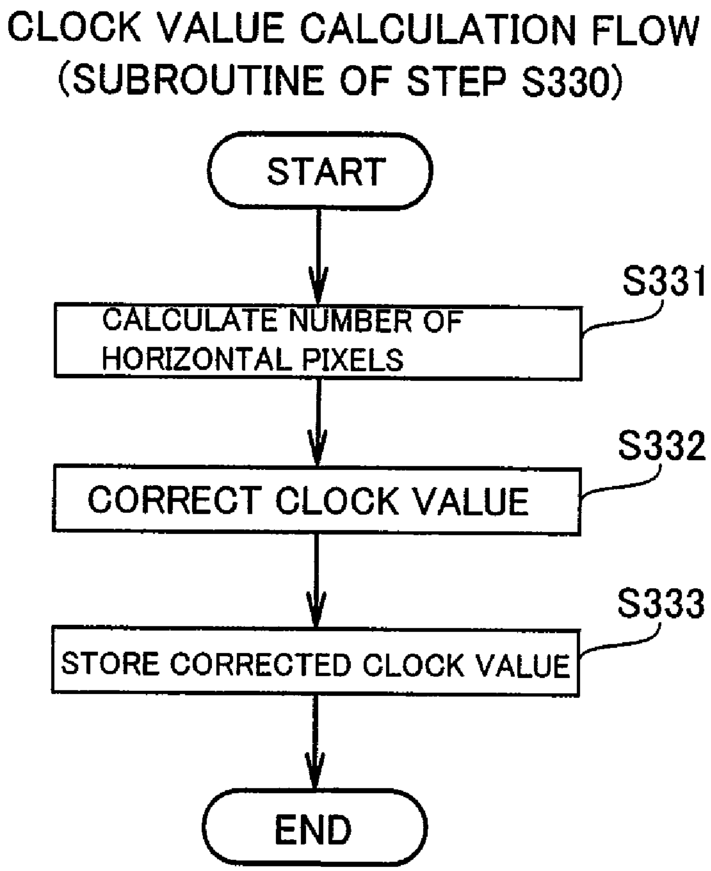

More specifically, the control portion 22 obtains the number NP of horizontal pixels between the left and right end positions PL and PR at a step S331, as shown in FIG. 11. At a step S332, the control portion 22 obtains the optimum clock value CLK by correcting the clock value CLK on the basis of the resolution (number NI of horizontal pixels) set as the current initial value and a change rate NR (=number NP of horizontal pixels/number NI of horizontal pixels) with reference to the number NP of horizontal pixels obtained at the step S331 with respect to the clock value CLK set as the current initial value. In other words, the control portion 22 obtains a corrected clock value CLK by multiplying the initial clock value CLK by the change rate NR (corrected clock value CLK=initial clock value CLK×change rate NR). At a step S333, the control portion 22 changes the clock value CLK from the initial value to the optimum value (corrected clock value) and stores the same in the memory portion 24 (see FIG. 1).

At a step S400 (see FIG. 4), the control portion 22 updates the left end position PL (see FIG. 2) on the basis of the clock value CLK obtained at the step S300 (see FIG. 7). More specifically, the control portion 22 executes a subroutine shown in FIG. 12.

Figure 12:
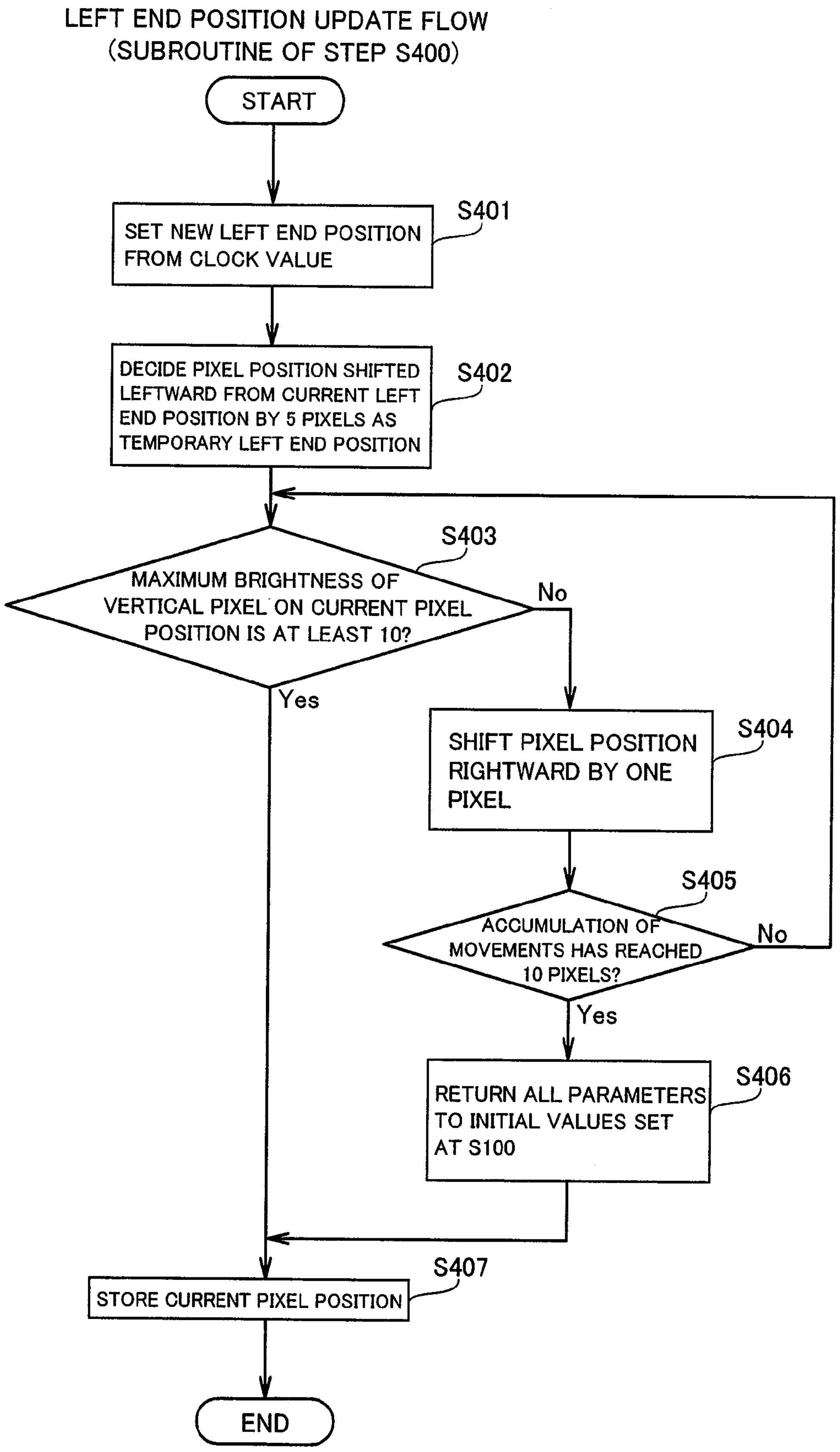

As shown in FIG. 12, the control portion 22 calculatedly sets a new left end position PL from the clock value CLK at a step S401. At a step S402, the control portion 22 temporarily decides a pixel position shifted leftward (along arrow Q1 in FIG. 2) from the left end position PL set at the step S401 by a prescribed number of pixels (5 pixels) as a temporary left end position PL and stores the same in the memory portion 24 (see FIG. 1).

According to this embodiment, the control portion 22 determines whether or not the maximum brightness of the vertical pixel train on the temporarily decided left end position PL is at least 10 at a step S403. If determining that the maximum brightness of the vertical pixel train on the temporarily decided left end position PL is not at least 10, the control portion 22 shifts the left end position PL (horizontal pixel position) temporarily decided at the step S402 rightward (along arrow P1 in FIG. 2) by one pixel and temporarily decides this position as a new left end position at a subsequent step S404. At a step S405, the control portion 22 determines whether or not the accumulation of the movements of the left end position PL has reached the prescribed number of pixels (10 pixels). If determining that the accumulation of the movements of the left end position PL has not reached the prescribed number of pixels (10 pixels), the control portion 22 returns to the step the step S403 and determines whether or not the maximum brightness of the vertical pixel train on the current left end position PL is at least 10. If determining that the accumulation of the movements of the left end position PL has reached the prescribed number of pixels (10 pixels) at the step S405, on the other hand, the control portion 22 sets all initial values temporarily decided at the step S100 (see FIG. 4) at a step S406.

If determining that the maximum brightness of the vertical pixel train on the current left end position PL is at least 10 at the step S403, on the other hand, the control portion 22 determines that this left end position PL (horizontal pixel position) is the left end position of one image frame, as shown in FIG. 12. Thus, the control portion 22 decides the left end position PL temporarily decided at present as the horizontal left end position PL to be displayed on the display screen portion 50 and stores this left end position PL in the memory portion 24 (see FIG. 1) at a step S407.

At a step S500 (see FIG. 4), the control portion 22 controls the phase value PH again on the basis of the left end position PL updated at the step S400. More specifically, the control portion 22 executes the subroutine shown in FIG. 9 again.

According to this embodiment, the control portion 22 calculates the sum A of the squares of the color gradations R, G and B of the pixel on the left end position PL at the step S501, similarly to the above. In other words, the control portion 22 calculates the sum A as follows, as shown in FIG. 5:

$$A=R1^2+G1^2+B1^2$$

At the step S502, the control portion 22 calculates the sum B of the squares of the color gradations R, G and B of the pixel leftwardly adjacent to the pixel (on the left end position) subjected to the calculation at the step S501. In other words, the control portion 22 calculates the sum B as follows, as shown in FIG. 5:

$$B=R2^2+G2^2+B2^2$$

Then, the control portion 22 calculates the differential C (C=A−B) between the calculated value (sum A of the squares) obtained at the step S501 and the calculated value (sum B of the squares) obtained at the step S502 at the step S503, and stores the current phase value PH and the calculated differential C in the memory portion 24 (see FIG. 1) as the initial values respectively at the step S504.

Thereafter the control portion 22 executes the steps S505 to S509 similarly to the above, thereby deciding the phase value PH again and storing the same in the memory portion 24 (see FIG. 1).

At the step S600 (see FIG. 4), the control portion 22 changes the display position for aligning the left and right ends of the horizontal effective image region and the upper and lower ends of the vertical effective image region with those of the display region of the display screen portion 50 respectively on the basis of the clock value CLK and the phase value PH decided at the steps S300 and S500 (see FIG. 4) respectively.

Figure 13:
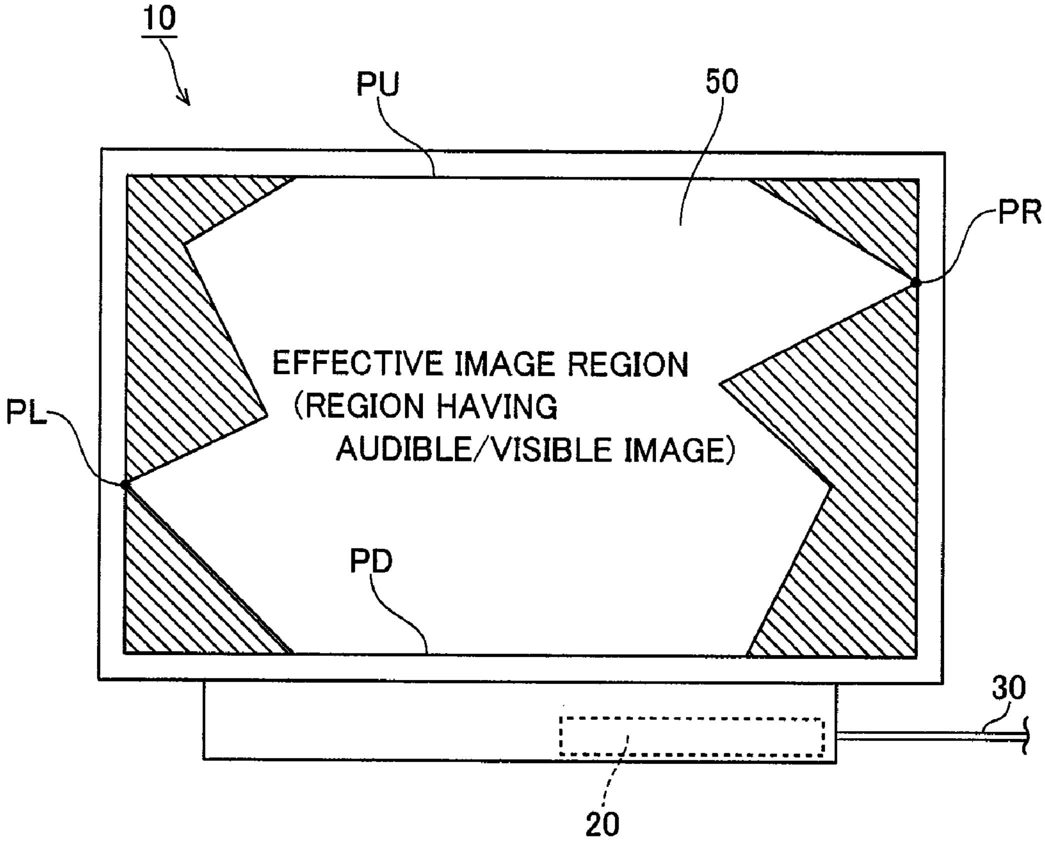
FIG. 13 illustrates the state of a display screen portion after completion of the automatic control flow for controlling the picture quality of the image displayed on the liquid crystal display according to the embodiment shown in FIG. 1.

Thus, automatic control of the picture quality control parameters is completed. Then, the control portion 22 makes a transition to control of displaying the controlled digital image signal 70 on the display screen portion 50 from the analog-to-digital conversion portion 21, as shown in FIG. 13.

According to this embodiment, as hereinabove described, the liquid crystal display 10 comprises the control portion 22 controlling the clock value CLK, the phase value PH, the horizontal imaging position and the vertical imaging position of the digital image signal 70 converted by the analog-to-digital conversion portion 21 so that the control portion 22 can control the clock value CLK, the phase value PH, the horizontal imaging position and the vertical imaging position of the digital image signal 70 converted by the analog-to-digital conversion portion 21 of the display body on the basis of the analog image signal 60 received from an analog image signal output device (image signal output device) externally connected to the display body. Even when the liquid crystal display 10 is connected with an analog image signal output device (image signal output device) having no communicative function, therefore, the control portion 22 can control the digital image signal 70 output to the display screen portion 50. Further, the control portion 22 decides the optimum phase value PH on the basis of the data of the pixels X1 and X2 (see FIG. 5) on the boundary between the image region of the horizontal effective image region HDISPW (see FIG. 2) having no image and the image region having an image in the digital image signal 70 thereby exactly obtaining the optimum phase value PH, whereby the phase value PH of the digital image signal 70 can be precisely controlled.

According to this embodiment, the control portion 22 is so formed as to determine the boundary between the image region having no image and the image region having an image on the basis of the data of the pixels X1 and X2 (see FIG. 5) adjacent to each other, whereby the control portion 22 can reliably identify the boundary (edge portion) between the image region of the horizontal effective image region HDISPW (see FIG. 2) having no image and the image region having an image.

According to this embodiment, the data of the pixels X1 and X2 (see FIG. 5) consist of the respective color gradations (R, G and B) corresponding to the three primary colors of light and the control portion 22 is so formed as to decide the optimum phase value PH on the basis of comparison between the respective color gradations (R, G and B), corresponding to the three primary colors of light, of the pixel X1 (see FIG. 5) on the left end position PL, closer to the image region having an image, of the boundary between the image region of the horizontal effective image region HDISPW (see FIG. 2) having no image and the image region having an image in the digital image signal 70 and the respective color gradations (R, G and B), corresponding to the three primary colors of light, of the pixel X2 (see FIG. 5) leftwardly adjacent to the pixel X1 (see FIG. 12) when deciding the optimum phase value PH. Thus, the respective color gradations (R, G and B), corresponding to the three primary colors of light, of each pixel data of the digital image signal 70 are directly used for searching for the phase value PH for most conspicuously displaying the boundary (edge portion) between the image region having no image and the image region having an image from the digital image signal 70 on the display screen portion 50 through phase control, whereby the control portion 22 can easily perform the phase control.

According to this embodiment, the control portion 22 is so formed as to determine the phase value PH maximizing the differential C between the sum A of the squares of the respective color gradations (R, G and B) of the pixel X1 (see FIG. 5) and the sum B of the squares of the respective color gradations (R, G and B) of the pixel X2 leftwardly adjacent to the pixel X1 (see FIG. 5) for searching for the phase value PH for most conspicuously displaying the boundary (edge portion) between the image region of the horizontal effective image region HDISPW (see FIG. 2) having no image and the image region having an image from the digital image signal 70 on the display screen portion 50 in consideration of influences exerted by all components of the respective color gradations (R, G and B), corresponding to the three primary colors of light, of the pixel data, thereby more reliably deciding the optimum phase value PH.

According to this embodiment, the control portion 22 is so formed as to obtain the maximum value of the differential C between the sum A of the squares of the respective color gradations (R, G and B) of the pixel X1 and the sum B of the squares of the respective color gradations (R, G and B) of the pixel X2 by putting the phase forward with a pitch width of the angle obtained by dividing the phase angle of 180° into 64 phase angles to be capable of deciding the optimum phase value PH while sequentially assigning a plurality of phase values PH (1 to 64) corresponding to the 64 phase angles divided from the phase angle of 180° respectively. Thus, the control portion 22 can more precisely decide the optimum phase value PH.

According to this embodiment, the control portion 22 is so formed as to store the current differential C in the memory portion 24 as the maximum value when the current differential C obtained by incrementing the phase value PH by 1 is greater than the differential C at the precedent phase value PH in the process of deciding the optimum phase value PH thereby regularly continuously holding the maximum value, whereby the processing of the control portion 22 can be further quickened dissimilarly to a method of extracting the maximum value after storing all differentials C between the sums of squares at the respective phase values PH (1 to 64).

According to this embodiment, the control portion 22 is so formed as to detect the pixel X1 on the left end position PL, closer to the image region of the horizontal effective image region HDISPW having an image, by scanning 10 horizontal pixels in the vicinity of the boundary between the horizontal back-porch width HBP and the horizontal effective image region HDISPW in the analog image signal rightward (along arrow P1 in FIG. 2). Thus, the control portion 22 scanning the boundary where the horizontal back-porch width HBP is switched to the horizontal effective image region HDISPW, providing the highest probability of detecting the pixel X1 on the left end position PL closer the image region having an image, can easily detect the pixel X1.

According to this embodiment, the control portion 22 detects the pixel X1 closer to the image region having an image in the horizontal effective image region HDISPW by scanning the range of 10 pixels rightward (along arrow P1 in FIG. 2) from the temporarily decided left end position PL in the horizontal back-porch width HBP, whereby the scanning range can be easily set on the basis of the number of pixels.

According to this embodiment, the control portion 22 is so formed as to detect the pixel X1 on the left end position PL closer the image region having an image on the basis of the brightness of the pixel detected by the control portion 22 when scanning the 10 horizontal pixels in the vicinity of the boundary between the horizontal back-porch width HBP and the horizontal effective image region HDISPW rightward (along arrow P1 in FIG. 2), thereby easily detecting the pixel X1 switched from the image region (dark region) having no image included in the horizontal effective image region HDISPW to the image region (bright region) having an image.

According to this embodiment, the control portion 22 is so formed as to decide the pixel as the pixel X1 on the left end position PL of the horizontal effective image region HDISPW when the brightness of the pixel detected by the control portion 22 is at least the prescribed value (10), thereby reliably detecting the pixel X1 switched from the image region (dark region) having no image included in the horizontal effective image region HDISPW to the image region (bright region) having an image.

According to this embodiment, the control portion 22 decides the pixel on the left end of the range of 10 horizontal pixels as the pixel X1 when not detecting the pixel X1 by scanning the range of 10 horizontal pixels for deciding the pixel on the end (left end) of the scanned range of 10 horizontal pixels, thereby preventing the display screen portion 50 from displaying the automatically controlled image region in a state omitting the left end thereof.

According to this embodiment, the control portion 22 is so formed as to control the phase value PH again on the basis of the result of control of the clock value CLK of the digital image signal 70 for controlling the phase value PH again on the basis of the digital image signal 70 displayed with the previously controlled clock value CLK, thereby more precisely controlling the picture quality.

According to this embodiment, the control portion 22 is so formed as to store the initial values of the clock value CLK and the phase value PH for deciding the optimum phase value PH in the memory portion 24 on the basis of the results of detection of the resolution and the vertical synchronizing frequency (refresh rate) of the digital image signal 70 converted by the analog-to-digital conversion portion 21 for starting controlling the phase value PH and the clock value CLK with reference to the initial values stored in the memory portion 24, whereby the time required for controlling the picture quality can be reduced dissimilarly to a case provided with no initial values.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the liquid crystal display 10 employed as an exemplary digital image display, the present invention is not restricted to this but is also applicable to a digital image display, other than the liquid crystal display, such as an organic EL display so far as the same comprises a control portion controlling the clock value, the phase value, the horizontal imaging position and the vertical imaging position of the digital image signal 70.

While the differential C between the sums A and B of the squares of the color gradations R, G and B of the pixel X1 on the left end position PL, closer to the image region having an image, on the boundary between the image region having no image and the image region having an image in the digital image signal 70 and the pixel X2 leftwardly adjacent to the pixel X1 is employed as the parameter for deciding the optimum phase value PH in the aforementioned embodiment, the present invention is not restricted to this but the differential between the squares of color gradations R, G and B of a pixel on the right end position PR, closer to the image region having an image, on the boundary between the image region having no image and the image region having an image and another pixel rightwardly adjacent to this pixel may alternatively be employed as the parameter for deciding the optimum phase value PH.

While the differential C between the sums A and B of the squares of the color gradations R, G and B of the pixel X1 on the left end position PL, closer to the image region having an image, on the boundary between the image region having no image and the image region having an image in the digital image signal 70 and the pixel X2 leftwardly adjacent to the pixel X1 is employed as the parameter for deciding the optimum phase value PH in the aforementioned embodiment, the present invention is not restricted to this but the differential between the sums of squares of any of the color gradations R, G and B of the pixel X1 and the pixel X2 leftwardly adjacent to the pixel X2 may alternatively be employed as the parameter for deciding the optimum phase value PH. Also according to this structure, the control portion 22 decides the optimum phase value PH through only information of one prescribed color gradation included in the respective color gradations, corresponding to the three primary colors of light, of the pixel data, whereby the processing of the control portion 22 can be quickened.

While the control portion 22 puts the phase forward with the pitch width of the angle obtained by dividing the phase angle of 180° into 64 phase angles for deciding the optimum phase value PH in the aforementioned embodiment, the present invention is not restricted to this but the control portion 22 may alternatively put the phase forward with a pitch width of another angle obtained by dividing the phase angle of 180° into a prescribed number other than 64.

What is claimed is:

1. A digital image display comprising:

an analog-to-digital conversion portion converting a received analog image signal to a digital image signal;

a display screen portion displaying said digital image signal converted by said analog-to-digital conversion portion; and a control portion controlling a clock value, a phase value, a horizontal position and a vertical position of said digital image signal converted by said analog-to-digital conversion portion, wherein said digital image signal includes a first pixel data value of a first pixel which is located at the end of an image region having an image, and a second pixel data value of a second pixel which is located at the end of an image region having no image and which is adjacent to said first pixel, and said control portion is so formed as to decide optimum said phase value on the basis of a result of comparison between the sum of squares of said first pixel data value and the sum of squares of said second pixel data value when controlling said phase value of said digital image signal.

2. The digital image display according to claim 1, wherein said control portion is so formed as to determine the boundary between said image region having no image and said image region having an image on the basis of said first pixel data value and said second pixel data value.

3. The digital image display according to claim 1, wherein said first pixel data value and said second pixel data value consist of respective color gradations corresponding to the three primary colors of light, and said control portion is so formed as to decide optimum said phase value on the basis of a result of comparison between said respective color gradations, corresponding to the three primary colors of light, of a first pixel on either the left end or the right end, closer to said image region having an image, of the boundary between said image region having no image and said image region having an image in said digital image signal and said respective color gradations, corresponding to the three primary colors of light, of a second pixel either leftwardly or rightwardly adjacent to said first pixel when deciding optimum said phase value.

4. The digital image display according to claim 3, wherein said control portion is so formed as to determine said phase value maximizing the difference between the sum of squares of at least one prescribed color gradation included in said respective color gradations, corresponding to the three primary colors of light, of said first pixel and the sum of squares of said at least one prescribed color gradation included in said respective color gradations, corresponding to the three primary colors of light, of said second pixel either leftwardly or rightwardly adjacent to said first pixel as optimum said phase value when deciding optimum said phase value.

5. The digital image display according to claim 4, wherein said control portion is so formed as to determine said phase value maximizing the difference between the sum of squares of said respective color gradations, corresponding to the three primary colors of light, of said first pixel and the sum of squares of said respective color gradations, corresponding to the three primary colors of light, of said second pixel either leftwardly or rightwardly adjacent to said first pixel as optimum said phase value when deciding optimum said phase value.

6. The digital image display according to claim 4, wherein said control portion is so formed as to obtain the maximum value of the difference between the sum of squares of said prescribed one color gradation included in said respective color gradations, corresponding to the three primary colors of light, of said first pixel and the sum of squares of said prescribed one color gradation included in said respective color gradations, corresponding to the three primary colors of light, of said second pixel either leftwardly or rightwardly adjacent to said first pixel by putting the phase forward with a pitch width of an equiangularly divided prescribed phase angle when deciding optimum said phase value.

7. The digital image display according to claim 6, wherein said control portion is so formed as to store the difference between the sum of squares of said prescribed one color gradation of said first pixel and the sum of squares of said prescribed one color gradation of said second pixel at a second phase value put forward from a first phase value by said prescribed phase angle as said maximum value when the difference between the sum of squares of said prescribed one color gradation of said first pixel and the sum of squares of said prescribed one color gradation of said second pixel at said second phase value is greater than the difference between the sum of squares of said prescribed one color gradation of said first pixel and the sum of squares of said prescribed one color gradation of said second pixel at said first phase value.

8. The digital image display according to claim 3, wherein said analog image signal is constituted of said image regions and a non-image region so provided as to enclose said image regions, and said control portion is so formed as to detect said first pixel on either the left end or the right end closer to said image region having an image included in said image regions by scanning a prescribed range in the vicinity of the boundary between said non-image region and said image regions in said analog image signal.

9. The digital image display according to claim 8, wherein said control portion is so formed as to detect said first pixel on either the left end or the right end closer to said image region having an image included in said image regions by scanning said prescribed range corresponding to a prescribed number of pixels from a prescribed position of said non-image region.

10. The digital image display according to claim 8, wherein said control portion is so formed as to detect said first pixel on either the left end or the right end closer to said image region having an image included in said image regions on the basis of the brightness of a pixel detected when scanning said prescribed range.

11. The digital image display according to claim 10, wherein said control portion is so formed as to decide said pixel as said first pixel on either the left end or the right end closer to said image region having an image when the brightness of said pixel detected by said control portion is in excess of a prescribed value.

12. The digital image display according to claim 8, wherein said control portion is so formed as to decide a pixel on either the left end or the right end of said prescribed range as said first pixel when not detecting said first pixel by scanning said prescribed range.

13. The digital image display according to claim 1, wherein said control portion is so formed as to control said phase value on the basis of a result of control of said clock value of said digital image signal.

14. The digital image display according to claim 1, further comprising a storage portion previously storing resolutions and vertical synchronizing frequencies displayable on said display screen portion by said control portion, wherein said control portion is so formed as to store the initial values of said clock value, said phase value, said horizontal position and said vertical position for deciding optimum said phase value on the basis of results of detection of said resolution and said vertical synchronizing frequency of said digital image signal converted by said analog-to-digital conversion portion.

* * * * *